United States Patent
DeYoung et al.

(10) Patent No.: US 6,658,995 B1
(45) Date of Patent: Dec. 9, 2003

(54) PROOFER

(75) Inventors: Perry R. DeYoung, Ada, MI (US); Vance J. Matz, Cedar Springs, MI (US)

(73) Assignee: Oliver Products Company, Grand Rapids, MI (US)

( * ) Notice: Subject to any disclaimer, the term of this patent is extended or adjusted under 35 U.S.C. 154(b) by 0 days.

(21) Appl. No.: 10/403,434

(22) Filed: Mar. 31, 2003

(51) Int. Cl.$^7$ ............... A23L 1/00; A47J 39/00; A47J 39/02; A47B 31/02; F25B 29/00
(52) U.S. Cl. ............... 99/468; 99/448; 99/476; 99/483; 165/267; 165/918; 219/386; 219/401; 312/236
(58) Field of Search ............... 99/326–333, 342, 99/352–355, 447–450, 467–476, 483, 516, 534; 34/196–200; 62/520, 419, 457.1; 126/20, 20.2, 369; 165/61, 64, 265, 267, 918, 919; 219/386, 387, 478, 480, 506, 521, 400, 401; 312/236; 426/231–233, 506, 418, 523

(56) References Cited

U.S. PATENT DOCUMENTS

| | | | | |
|---|---|---|---|---|
| 4,373,430 A | * | 2/1983 | Allen ............... 99/468 |
| 4,398,880 A | | 8/1983 | Seiling | |
| 4,483,243 A | * | 11/1984 | Cote ............... 99/476 X |
| 4,560,139 A | | 12/1985 | Dahlke | |
| 4,565,277 A | | 1/1986 | Benier | |
| 4,587,946 A | * | 5/1986 | Doyon et al. ........ 219/401 X |
| 4,635,540 A | * | 1/1987 | Dowds ............... 99/468 |
| 4,648,382 A | * | 3/1987 | Greenbacker ........ 165/919 |
| 4,674,402 A | * | 6/1987 | Raufeisen ........... 312/236 X |
| 4,732,768 A | | 3/1988 | Kovach | |
| 5,086,693 A | * | 2/1992 | Tippmann et al. .... 99/468 X |
| 5,201,364 A | * | 4/1993 | Tipmann et al. ..... 99/448 X |
| 5,203,258 A | * | 4/1993 | Tippmann et al. .... 34/200 X |
| 5,228,385 A | * | 7/1993 | Friedrich et al. ..... 99/352 |
| 5,273,360 A | * | 12/1993 | Wyatt et al. ........ 219/386 X |
| 5,404,935 A | * | 4/1995 | Liebermann ......... 99/470 X |
| 5,520,102 A | * | 5/1996 | Monetti ............. 99/467 X |
| 5,735,190 A | | 4/1998 | Sham | |
| 6,391,350 B1 | | 5/2002 | Iwashita et al. | |

* cited by examiner

*Primary Examiner*—Timothy F. Simone
(74) *Attorney, Agent, or Firm*—Price, Heneveld, Cooper, DeWitt & Litton

(57) ABSTRACT

A proofer includes an enclosure defining a chamber. An air circulation system includes a passageway having an air inlet and an air outlet connected to the chamber. A first fan pulls air into the air inlet from the chamber, and expels air from the outlet into the chamber. A fluid reservoir is positioned adjacent the air circulation system, such that air contacting fluid in the reservoir upon actuation of the first fan is humidified. A heating element heats fluid in the fluid reservoir, and a second fan flows air over at least a portion of the reservoir outside the chamber and cools fluid in the reservoir. A controller selectively actuates the heating element and the second fan based upon the temperature and/or humidity in the chamber to control the temperature of the fluid in the reservoir and thereby reduce fluctuations in temperature and humidity within the chamber.

19 Claims, 2 Drawing Sheets

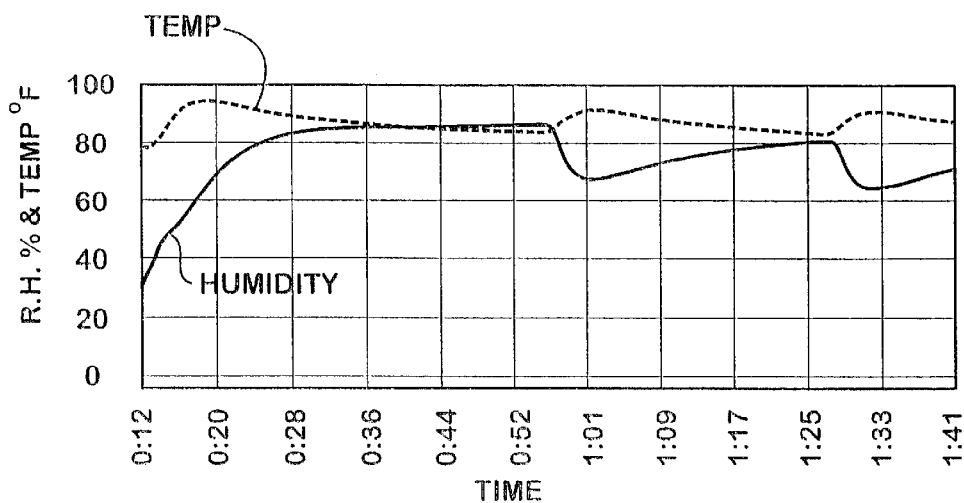
PRIOR ART   Fig. 3
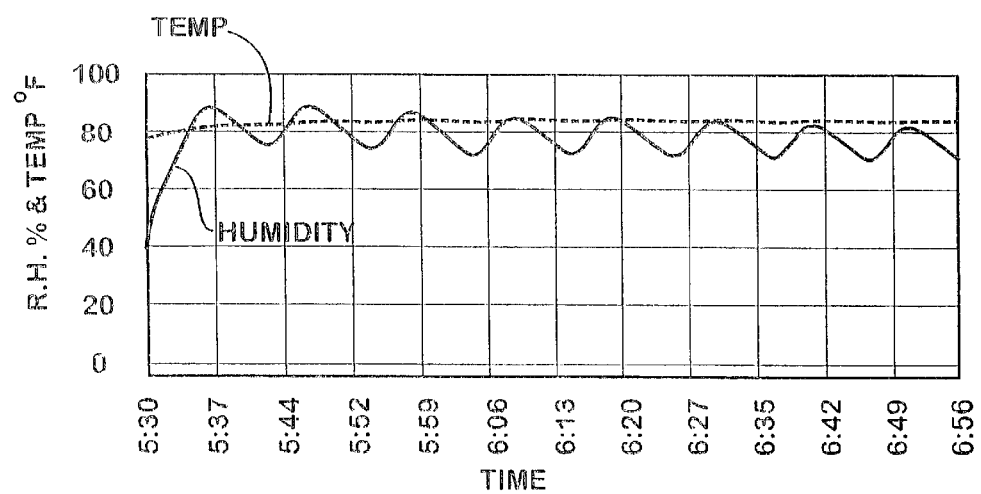
Fig. 4

PROOFER

BACKGROUND OF THE INVENTION

Dough proofers or fermentation rooms are used for conditioning dough and cooling baked bread. The air temperature and humidity in a dough proofer are controlled in an attempt to keep the temperature and humidity at or near desired levels. Dough proofers are thermally insulated enclosures, and may vary in size from a small box with shelving to a room with space for many portable bread racks. Known dough proofers are heated by steam coils or electric heating elements located inside the enclosure. Alternately, known dough proofers may be heated by self-contained units connected to the proofer by air ducts. However, the temperature and/or humidity in existing dough proofers may experience substantial fluctuations, thereby leading to various problems proofing the dough.

SUMMARY OF THE INVENTION

One aspect of the present invention is a proofer for conditioning dough. The proofer includes an enclosure defining a chamber configured to receive dough for conditioning. An air circulation system includes a passageway having an air inlet connected to the chamber, and an air outlet that is also connected to the chamber. A first fan pulls air into the air inlet from the chamber, and expels air from the outlet into the chamber. A fluid reservoir is positioned adjacent the air circulation system, such that air contacts fluid in the reservoir upon actuation of the first fan. A heating element is configured to heat fluid in the fluid reservoir. A second fan flows air over at least a portion of the reservoir that is outside the chamber to thereby cool fluid in the reservoir. A controller is operably connected to the first and second fans and to the heating element. The controller turns off the heating element and turns on the second fan when the humidity in the chamber reaches a selected level to thereby cool the fluid in the reservoir and reduce fluctuations in temperature and humidity within the chamber.

Another aspect of the present invention is a proofer for conditioning dough including an enclosure defining a chamber configured to receive dough. The proofer includes a fluid reservoir and a fan configured to circulate air and humidify air in the chamber with fluid from the fluid reservoir. A heating element is configured to heat fluid in the fluid reservoir, and a cooling element is configured to cool fluid in the fluid reservoir. A controller is operably connected to the fan and to the cooling element. The controller selectively actuates the heating element and the cooling element to alleviate fluctuations in the humidity level of air in the chamber.

Yet another aspect of the present invention is a proofer for conditioning dough. The proofer includes an outer housing defining upper and lower horizontal walls, opposite vertical sidewalls, a rear wall, and a front side having an enlarged access opening. The outer housing has first and second vent openings allowing air to flow between the intermediate space and outside the outer housing. The proofer also includes an inner enclosure positioned within the housing and defining a chamber configured to receive dough for conditioning. The chamber defines horizontal upper and lower sidewalls and opposite vertical sidewalls. The inner enclosure is spaced inwardly from the outer housing to define an intermediate space. The enclosure has an inner opening generally aligned with the enlarged access opening, and a door is movably mounted to the housing for closing off the access opening. An air circulation system includes a vertical passageway having an air inlet connected to the chamber, and an air outlet that is also connected to the chamber. A first heating element in the passageway heats air flowing through the passageway. A first fan is adapted to pull air into the air inlet and expel air from the outlet. A fluid reservoir in the lower sidewall of the enclosure is positioned adjacent the outlet of the air circulation system. The reservoir is positioned such that air flows over fluid in the reservoir upon actuation of the first fan and flows into the chamber. The fluid reservoir has an outer portion facing the intermediate space. A second heating element is configured to heat fluid in the fluid reservoir. A second fan is configured to draw air through the first vent opening into the intermediate space, and blow air over the outer portion of the fluid reservoir and out through the second vent opening. A controller is operably connected to the first and second fans and to the first and second heating elements. The controller is configured to turn off the second heating element and turn on the second fan when the humidity in the chamber reaches a selected level.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a graph illustrating fluctuations in temperature and humidity in prior art proofers; and FIG. 4 is a graph illustrating the reduced fluctuations in temperature and humidity provided by the proofer of the present invention.

DETAILED DESCRIPTION OF PREFERRED EMBODIMENT

Figure 1:
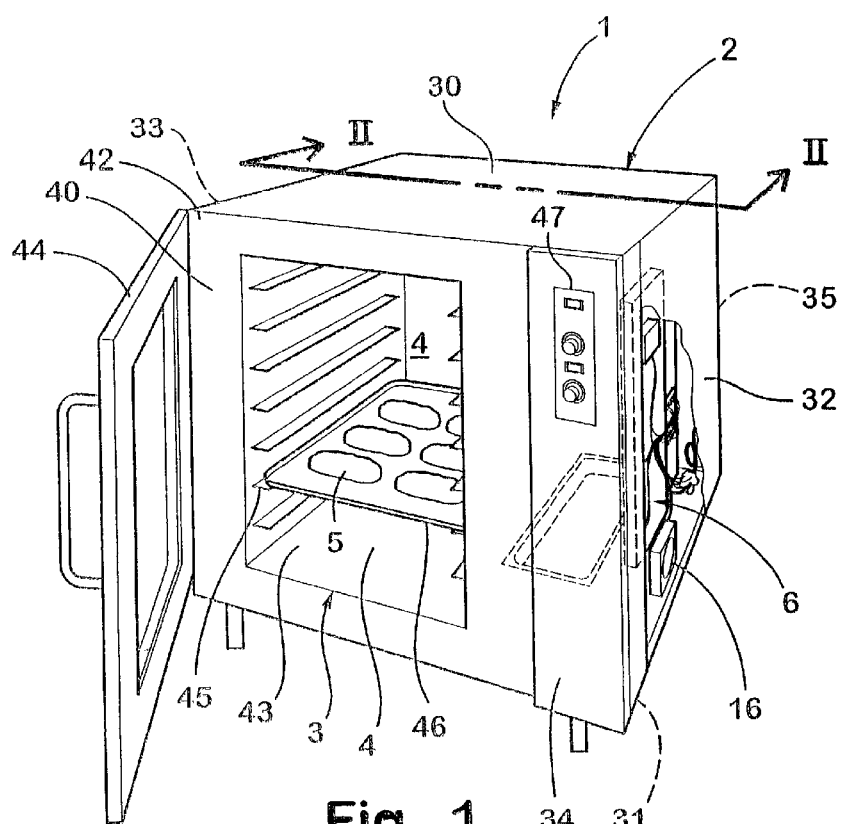
FIG. 1 is a partially fragmentary perspective view illustrating a proofer according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
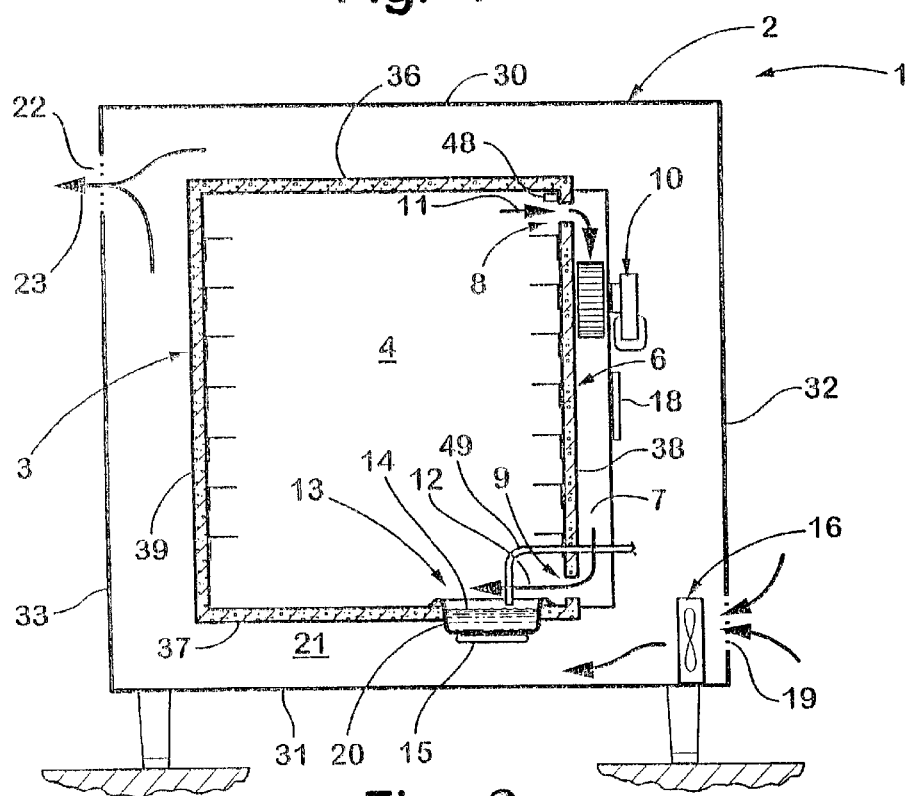
FIG. 2 is a cross-sectional view of the proofer of FIG. 1 taken along the line II—II of FIG. 1.

With reference to FIG. 1, a dough proofer 1 according to one aspect of the present invention includes an outer housing 2 and an enclosure 3 defining a chamber 4 configured to receive bread dough 5 for conditioning. An air circulation system 6 includes a passageway 7 (see also FIG. 2) having an air inlet 8 connected to the chamber 4, and an air outlet 9 that is also connected to the chamber 4. A first electrically powered fan 10 is adapted to pull air 11 into the air inlet 8 from the chamber 4, and expel air 12 from the outlet 9 into the chamber 4. A fluid reservoir 13 adjacent the air circulation system 6 is positioned such that the air 12 flowing from outlet 9 contacts water 14 in the reservoir 13 upon actuation of the first fan 10. The air 12 becomes humidified due to contact with the water 14, and flows into the chamber 4. An electrical heating element 15 is configured to heat the water 14 in the fluid reservoir 13. A second electric fan 16 is configured to flow air 17 over at least a portion of the fluid reservoir 13 to cool the water 14 in the reservoir. A controller 18 is operably connected to the first fan 10, the second fan 16, and to the heating element 15. The controller turns off the heating element 15, and turns on the second fan 16 when the temperature and/or humidity in the chamber 4 reaches a selected level.

Dough proofers including an outer housing 2, an inner enclosure 3, a controller 18, air circulation system 6, and fluid reservoir 13 are generally known, such that these components will not be described in detail herein. One example of such a known dough proofer is a model EA5A8W, available from Moffat Ltd. of Christchurch, New Zealand.

In contrast to known dough proofers, the dough proofer 1 of the present invention includes a second fan 16 that draws air into an inlet vent 19 in outer housing 2. The air 17 flows over the portion 20 of fluid reservoir 13 that is exposed to the intermediate space 21 between the outer housing 2 and enclosure 3. The air 17 becomes heated due to the contact with the fluid reservoir 13, and flows out of an outlet vent 22 in outer housing 2 as heated air 23. The vents 19 and 22, and fan 16 thereby cool intermediate space 21 and water in fluid reservoir 13.

With reference to FIG. 3, existing dough proofers lacking a second fan 16 and vents 19 and 22 have relatively large fluctuations in temperature and percentage of humidity within the chamber 4. In general, known proofers include a controller that turns off the first fan and the heating element 15 when a desired temperature or humidity in the chamber 4 is reached. Because the water 14 in the reservoir is heated to a relatively high temperature, the water 14 will continue to heat and humidify air in chamber 4 even after the heating element and fan are turned off. Thus, the temperature and humidity in chamber 4 fluctuates substantially as illustrated in FIG. 3, leading to numerous problems proofing the dough.

With further reference to FIG. 4, the second fan 16 of the present dough proofer 1 is actuated by the controller 18 at the time the first fan 10 and heating element 15 are turned off. In this way, the air 17 is circulated over the exposed portion 20 of the fluid reservoir 13, thereby cooling the water 14 in the fluid reservoir 13 and providing much more stable temperature and humidity conditions within the chamber 4 as illustrated in FIG. 4. The vents 19 and 22 in the outer housing 2 permit cool air to flow into the intermediate space 21, and heated air 23 to be expelled to thereby facilitate cooling of the water 14 in fluid reservoir 13.

Outer housing 2 generally includes an upper wall 30, first and second vertical sidewalls 32 and 33, a front wall 34, and a rear wall 35. Similarly, the enclosure 3 includes an upper wall 36, lower wall 37, sidewalls 38 and 39, a front wall portion 40 and rear wall 41. An enlarged opening 42 in housing 2 is generally aligned with the enlarged opening 43 of enclosure 3 to permit access to the chamber 4 when the door 44 is pivoted to the open position.

A plurality of supports 45 are configured to removably support a plurality of trays 46 that contain the bread dough 5 during conditioning. Controls 47 can be manually set by an operator to control the humidity and/or temperature within the chamber 4. The controls 47 are operably connected to the controller 18. Sensors 48 determine the temperature and/or humidity within the chamber 4, and are operably connected to the controller 18. A fluid supply 49 supplies water to the fluid reservoir 13 to replace the water 14 as it evaporates to humidify the air within the chamber 4.

In a preferred embodiment, the controller 18 is configured to turn on the second fan 16 at the same time the heating element 15 is turned off. In this configuration, the second fan 16 is actuated at the time the temperature within the chamber 4 reaches a desired level. However, the controller 18 may also be configured to actuate the second fan 16 and turn off the heater 15 when a desired humidity level is reached. When the temperature and/or humidity within the chamber 4 drop to predetermined levels after the heating element 15 is turned off, the second fan 16 is shut off and the heating element 15 is turned back on to again raise the temperature and humidity in the chamber 4 to the desired level. It should be appreciated that variations in the sequence and timing provided by the controller are within the present invention.

The dough proofer 1 of the present invention includes a unique cooling arrangement to provide substantially less fluctuation in the temperature and humidity within the chamber. The dough proofer thereby improves the conditioning of the bread dough or the like in a manner not heretofore possible.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A proofer for conditioning dough, comprising:
    an enclosure defining a chamber configured to receive dough for conditioning;
    an air circulation system including a passageway having an air inlet connected to said chamber, and an air outlet connected to said chamber;
    a first fan adapted to pull air into said air inlet from said chamber and expel air from said outlet into said chamber;
    a fluid reservoir adjacent said air circulation system, said reservoir positioned such that air contacts fluid in said reservoir upon actuation of said first fan and flows into said chamber;
    a heating element configured to heat fluid in said fluid reservoir;
    a second fan configured to flow air over at least a portion of said reservoir outside said chamber to cool fluid in said reservoir; and
    a controller operably connected to said first and second fans and to said heating element, said controller configured to turn off said heating element and turn on said second fan when the humidity in said chamber reaches a selected level.

2. The proofer of claim 1, wherein:
    said enclosure defines upper and lower walls and a vertical sidewall; and
    said passageway extends vertically along said sidewall with said air inlet located adjacent said upper wall, and said outlet located adjacent said lower wall.

3. The proofer of claim 2, wherein:
    said reservoir comprises a shallow recess in said lower wall of said enclosure;
    said heating element comprises a first heating element; and including:
    a second heating element positioned in said passageway for heating air flowing therethrough, said second heating element operably connected to said controller, said controller configured to turn off said second heating element when said first fan is turned off.

4. The proofer of claim 3, including:

an outer housing, said enclosure disposed within said outer housing and spaced apart therefrom to define an intermediate space;

said fluid reservoir having a portion thereof exposed to said intermediate space; and said second fan configured to flow air over said exposed portion of said fluid reservoir.

5. The proofer of claim 4, wherein:

said outer housing includes an inlet vent opening adjacent said second fan and an outlet vent opening spaced apart from said inlet vent opening to exhaust air that has been heated from contact with said fluid reservoir.

6. The proofer of claim 5, wherein:

said enclosure defines a first lower wall, and said outer housing defines a second lower wall spaced below said first lower wall to define a gap; said second fan positioned to flow air through said gap.

7. The proofer of claim 1, wherein:

said controller is configured to turn off said heating element and first fan at the same time said second fan is turned on.

8. The proofer of claim 1, wherein:

said enclosure defines vertical inner sidewalls and includes a plurality of inwardly extending supports; and including:

at least one dough tray removably supported on selected ones of said supports in said chamber.

9. The proofer of claim 1, including:

at least one fluid supply line configured to supply water to said reservoir.

10. A proofer for conditioning dough, comprising:

an enclosure defining a chamber configured to receive dough;

a fluid reservoir;

a fan configured to circulate air and humidify air in said chamber with fluid from said fluid reservoir;

a heating element configured to heat fluid in said fluid reservoir;

a cooling element configured to cool fluid in said fluid reservoir; and a controller operably connected to said fan and to said cooling element, said controller selectively actuating said heating element and said cooling element to alleviate fluctuations in the humidity level of air in said chamber.

11. The proofer of claim 10, wherein:

said fan comprises a first fan, and said cooling element comprises a second fan.

12. The proofer of claim 11, wherein:

an outer housing, said enclosure disposed within said outer housing and spaced apart therefrom to define an intermediate space;

said fluid reservoir having a portion thereof exposed to said intermediate space; and said second fan configured to flow air over said exposed portion of said fluid reservoir.

13. The proofer of claim 12, wherein:

said outer housing includes an inlet vent opening adjacent said second fan and an outlet vent opening spaced apart from said inlet vent opening to exhaust air that has been heated from contact with said fluid reservoir.

14. The proofer of claim 10, wherein:

said controller turns off said heating element and turns on said cooling element to reduce fluctuations in temperature and humidity in said chamber.

15. The proofer of claim 12, wherein:

said controller simultaneously turns off said heating element and turns on said cooling element to reduce fluctuations in temperature and humidity in said chamber.

16. A proofer for conditioning dough, comprising:

an outer housing defining upper and lower horizontal walls, opposite vertical sidewalls, a rear wall, and a front side having an enlarged access opening, said outer housing having first and second vent openings allowing air to flow between said intermediate space and outside said outer housing;

an inner enclosure positioned with said housing and defining a chamber, said chamber defining horizontal upper and lower sidewalls and opposite vertical sidewalls, said inner enclosure spaced inwardly from said outer housing to define an intermediate space, said chamber configured to receive dough for conditioning, said enclosure having an inner opening generally aligned with said enlarged access opening;

a door movably mounted to said housing for closing off said access opening;

an air circulation system including a vertical passageway having an air inlet connected to said chamber, and an air outlet connected to said chamber;

a first heating element in said passageway that heats air in said passageway;

a first fan adapted to pull air into said air inlet and expel air from said outlet;

a fluid reservoir in said lower sidewall of said enclosure adjacent said outlet of said air circulation system, said reservoir positioned such that air flows over fluid in said reservoir upon actuation of said first fan and flows into said chamber, said fluid reservoir having an outer portion facing said intermediate space;

a second heating element configured to heat fluid in said fluid reservoir;

a second fan configured to draw air through said first vent opening into said intermediate space and blow air over said outer portion of said fluid reservoir and out through said second vent opening; and a controller operably connected to said first and second fans and to said first and second heating elements, said controller configured to turn off said second heating element and turn on said second fan when the humidity in said chamber reaches a selected level.

17. The proofer of claim 16, wherein:

said controller is configured to turn off said heating element and first fan at the same time said second fan is turned on.

18. The proofer of claim 17, wherein:

said enclosure defines a first lower wall, and said outer housing defines a second lower wall spaced below said first lower wall to define a gap; said second fan positioned to flow air through said gap.

19. The proofer of claim 16, wherein:

said enclosure defines upper and lower walls and a vertical sidewall; and said passageway extends vertically along said sidewall with said air inlet located adjacent said upper wall, and said outlet located adjacent said lower wall.

* * * * *